United States Patent [19]

Mottahedeh

[11] Patent Number: 5,554,970
[45] Date of Patent: Sep. 10, 1996

[54] SPEED ALARM SYSTEM FOR AN AUTOMOBILE

[76] Inventor: Haghnazar Mottahedeh, 19400 Collier St., Tarzana, Calif. 91356

[21] Appl. No.: 506,017

[22] Filed: Jul. 24, 1995

[51] Int. Cl.$^6$ ........................................... B60Q 1/00
[52] U.S. Cl. ...................... 340/441; 340/466; 340/936; 340/961
[58] Field of Search .................... 340/441, 466, 340/936, 961

[56] References Cited

U.S. PATENT DOCUMENTS

| 3,823,383 | 7/1974 | Mallinger | 340/441 |
| 4,016,536 | 4/1977 | La Chapelle | 340/441 |

*Primary Examiner*—Jeffery Hofsass
*Assistant Examiner*—Daryl C. Pope

[57] ABSTRACT

A speed alarm system for an automobile comprised of a first circular disk having a semi-circular electronic indicator grid formed around an outer periphery thereof. The first circular disk is rotatably positioned on a speedometer relay of an automobile and coupled thereto by a knob portion. A second circular disk has a circular recess formed therein inwardly of an outer periphery thereof. The second circular disk is positionable through an upper portion of the knob portion whereby the semi-circular electronic grid of the first circular disk is in selective alignment with the circular recess of the second circular disk. An indicating needle has a first end rotatably coupled with the upper portion of the knob portion. A second end has a magnetic portion extending downwardly through the circular recess of the second circular disk. A speaker has wiring extending outwardly thereof to couple with the existing speedometer relay of the automobile and with the semi-circular electronic grid of the first circular disk.

5 Claims, 3 Drawing Sheets

SPEED ALARM SYSTEM FOR AN AUTOMOBILE

BACKGROUND OF THE INVENTION

1. Field of the Invention

The present invention relates to a speed alarm system for an automobile and more particularly pertains to alerting a driver that they are exceeding a set speed in an automobile with a speed alarm system for an automobile.

2. Description of the Prior Art

The use of speed alarms is known in the prior art. More specifically, speed alarms heretofore devised and utilized for the purpose of sending signals to alert a driver of certain speeds are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,608,551 to Takeo et al. discloses a speed alarm system for automotive vehicles.

U.S. Pat. No. 4,433,746 to Steel discloses a vehicle speed control.

U.S. Pat. No. 4,229,727 to Gilhooley discloses a vehicle speed alarm.

U.S. Pat. No. 4,223,297 to Nomura et al. discloses a speed alarm system for a motor vehicle.

U.S. Pat. No. 3,859,629 to Komiyama et al. discloses a speed alarm system for an automobile.

U.S. Pat. No. 3,748,641 to Hartung discloses a speed limiter and alarm for internal combustion engine.

While these devices fulfill their respective, particular objective and requirements, the aforementioned patents do not describe a speed alarm system for an automobile for alerting a driver that they are exceeding a set speed in an automobile.

In this respect, the speed alarm system for an automobile according to the present invention substantially departs from the conventional concepts and designs of the prior art, and in doing so provides an apparatus primarily developed for the purpose of alerting a driver that they are exceeding a set speed in an automobile.

Therefore, it can be appreciated that there exists a continuing need for new and improved speed alarm system for an automobile which can be used for alerting a driver that they are exceeding a set speed in an automobile. In this regard, the present invention substantially fulfills this need.

SUMMARY OF THE INVENTION

In the view of the foregoing disadvantages inherent in the known types of speed alarms now present in the prior art, the present invention provides an improved speed alarm system for an automobile. As such, the general purpose of the present invention, which will be described subsequently in greater detail, is to provide a new and improved speed alarm system for an automobile and method which has all the advantages of the prior art and none of the disadvantages.

To attain this, the present invention essentially comprises a first circular disk having an aperture formed through a central portion thereof. The first circular disk has a semi-circular electronic indicator grid formed around an outer periphery thereof. The first circular disk is rotatably positioned on an existing speedometer relay of an automobile through the aperture thereof and coupled thereto by a knob portion. The device contains a second circular disk having an aperture formed through a central portion thereof. The second circular disk has a circular recess formed therein inwardly of an outer periphery thereof. The second circular disk is positionable with the aperture thereof receiving an upper portion of the knob portion therethrough whereby the semi-circular electronic grid of the first circular disk is in selective alignment with the circular recess of the second circular disk. An outer edge of the second circular disk has indicia thereon for the indication of speed attained by the vehicle. The first circular disk is rotatable in relationship to the second circular disk whereby the electronic grid can be positioned strategically within the circular recess. The device contains an indicating needle having a first end and a second end. The first end is rotatably coupled with the upper portion of the knob portion. The second end has a magnetic portion extending downwardly therefrom. The magnetic portion extends through the circular recess of the second circular disk. The device contains a speaker secured within a housing. The housing has a back portion with adhesive thereon. The adhesive has a peel-off layer disposed thereon. The speaker has wiring extending outwardly of the housing to couple with the existing speedometer relay of the automobile and with the semi-circular electronic grid of the first circular disk. The speaker is adapted for securement within the automobile.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved speed alarm system for an automobile which has all the advantages of the prior art speed alarms and none of the disadvantages.

It is another object of the present invention to provide a new and improved speed alarm system for an automobile which may be easily and efficiently manufactured and marketed.

It is a further object of the present invention to provide a new and improved speed alarm system for an automobile which is of durable and reliable construction.

An even further object of the present invention is to provide a new and improved speed alarm system for an automobile which is susceptible of a low cost of manufacture with regard to both materials and labor, and which accordingly is then susceptible of low prices of sale to the consuming public, thereby making such a speed alarm system for an automobile economically available to the buying public.

Still yet another object of the present invention is to provide a new and improved speed alarm system for an automobile which provides in the apparatuses and methods of the prior art some of the advantages thereof, while simultaneously overcoming some of the disadvantages normally associated therewith.

Even still another object of the present invention is to provide a new and improved speed alarm system for an automobile for alerting a driver that they are exceeding a set speed in an automobile.

Lastly, it is an object of the present invention to provide a new and improved speed alarm system for an automobile comprised of a first circular disk having a semi-circular electronic indicator grid formed around an outer periphery thereof. The first circular disk is rotatably positioned on an existing speedometer relay of an automobile and coupled thereto by a knob portion. A second circular disk has a circular recess formed therein inwardly of an outer periphery thereof. The second circular disk is positionable through an upper portion of the knob portion whereby the semi-circular electronic grid of the first circular disk in selective alignment with the circular recess of the second circular disk. An indicating needle has a first end rotatably coupled with the upper portion of the knob portion. A second end has a magnetic portion extending downwardly through the circular recess of the second circular disk. A speaker has wiring extending outwardly thereof to couple with the existing speedometer relay of the automobile and with the semi-circular electronic grid of the first circular disk.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
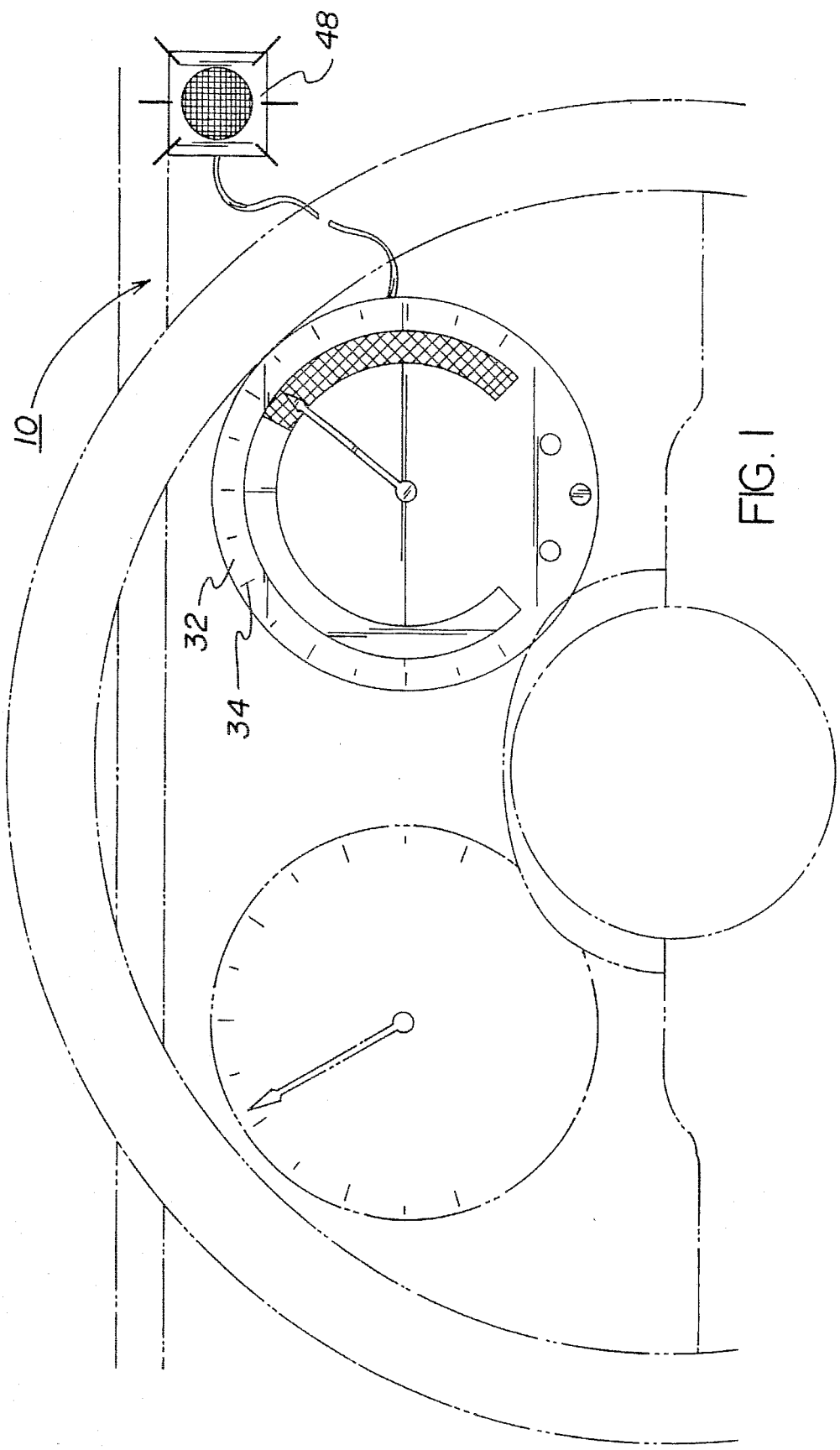
FIG. 1 is a front view of the preferred embodiment of the speed alarm system for an automobile constructed in accordance with the principles of the present invention in place on an automobile.
Figure 2:
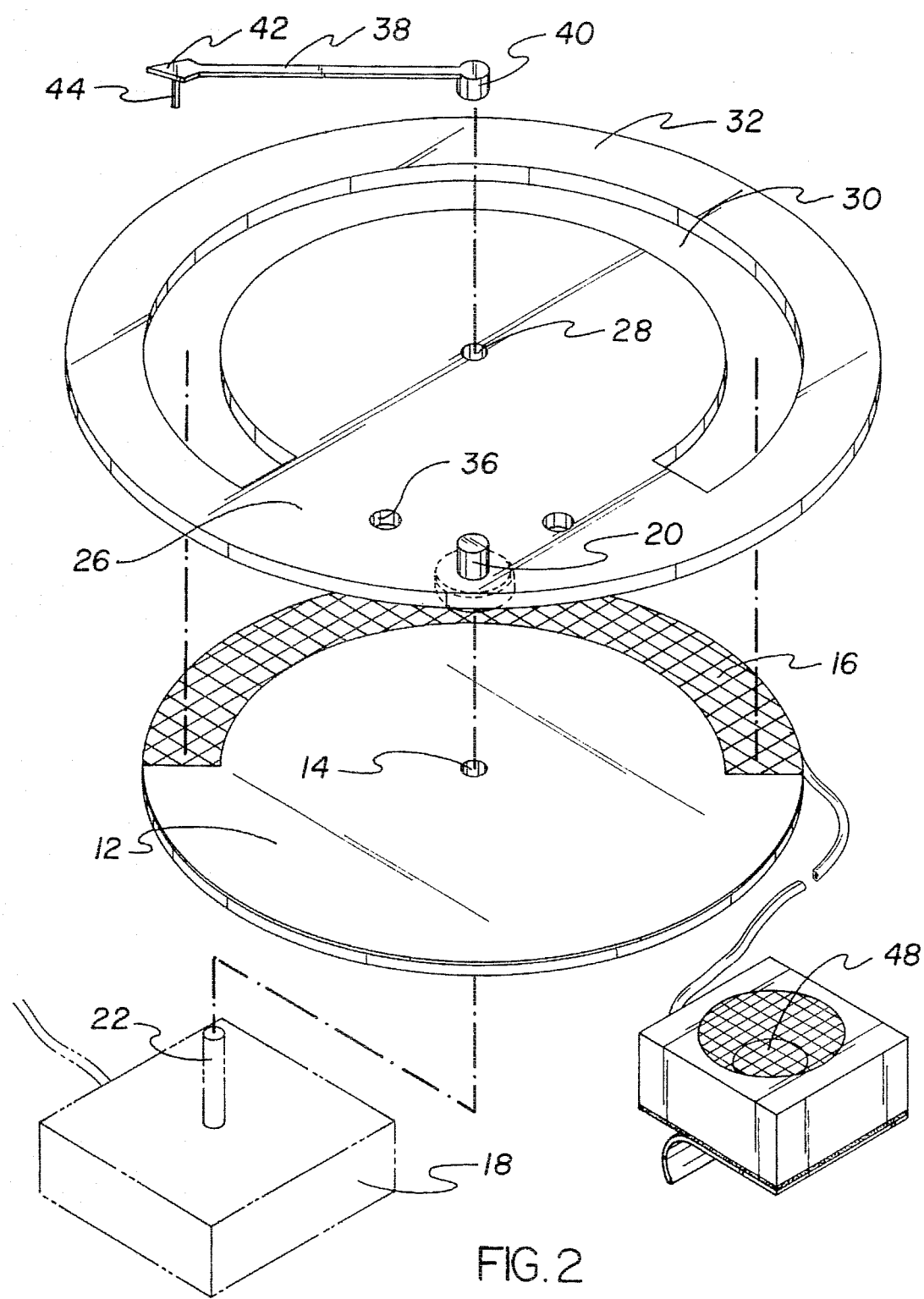
FIG. 2 is an exploded perspective view of the present invention.
Figure 3:
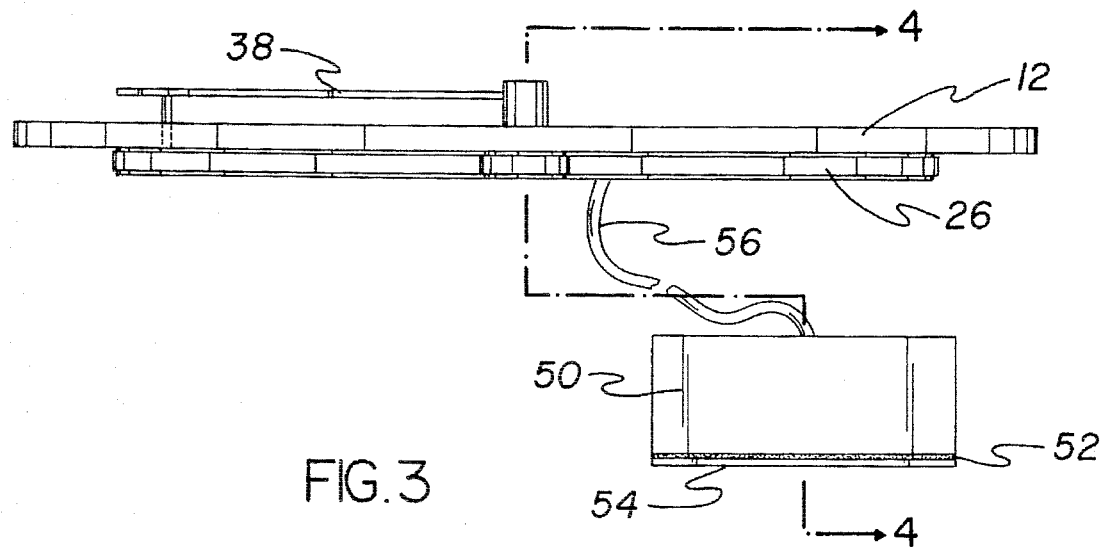
FIG. 3 is a side elevation view of the present invention.
Figure 4:
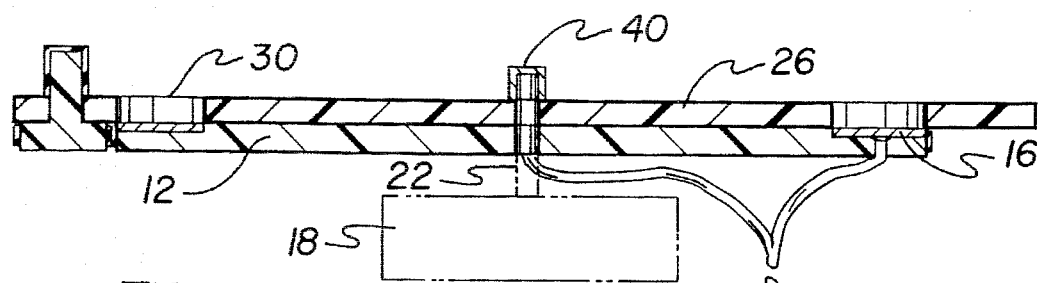
FIG. 4 is a cross-sectional view as taken along line 4—4 of FIG. 3.
Figure 5:
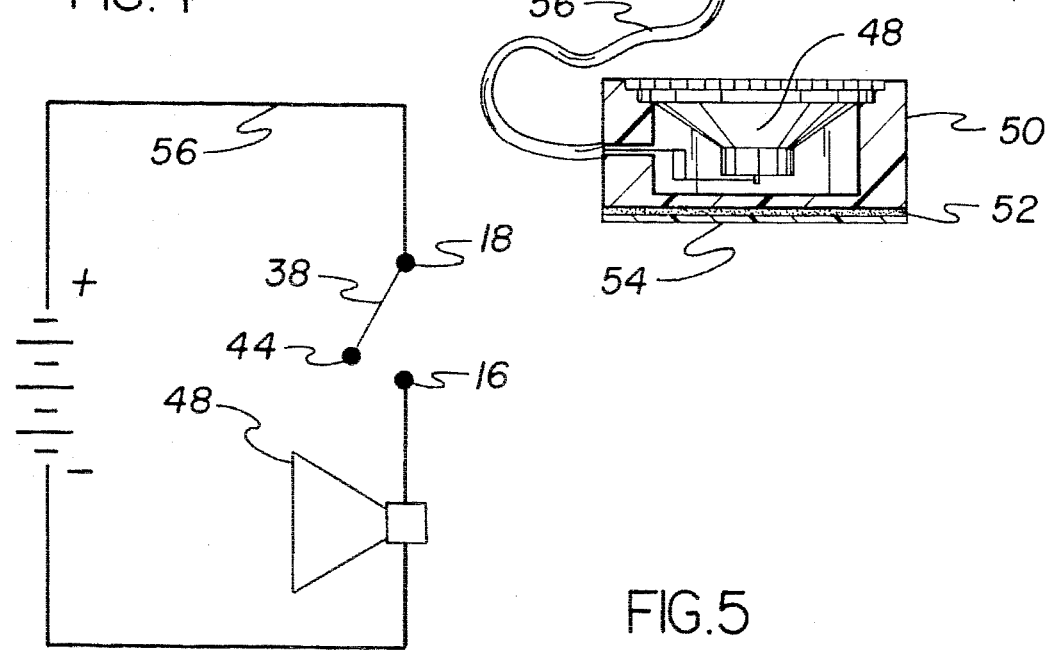
FIG. 5 is a schematic drawing of the function of the present invention.

With reference now to the drawings, and in particular, to FIG. 1 thereof, the preferred embodiment of the new and improved speed alarm system for an automobile embodying the principles and concepts of the present invention and generally designated by the reference number 10 will be described.

Specifically, it will be noted in the various Figures that the device relates to a new and improved speed alarm system for an automobile for alerting a driver that they are exceeding a set speed in an automobile. In its broadest context, the device consists of a first circular disk, a second circular disk. Such components are individually configured and correlated with respect to each other so as to attain the desired objective.

The first component of the device 10 is a first circular disk 12. The first circular disk 12 has an aperture 14 formed through a central portion thereof. The first circular disk 12 has a semi-circular electronic indicator grid 16 formed around an outer periphery thereof. The first circular disk 12 is rotatably positioned on an existing speedometer relay 18 of an automobile through the aperture 14 thereof and coupled thereto by a knob portion 20. The existing speedometer relay has a rod 22 that extends upwardly that will rotate to indicate the speed attained by the vehicle.

The second component of the device 10 is a second circular disk 26. The second circular disk 26 has an aperture 28 formed through a central portion thereof. The second circular disk 26 has a circular recess 30 formed therein inwardly of an outer periphery thereof. The circular recess 30 is not a complete circle, but instead is about 275 degrees around. The second circular disk 26 is positionable with the aperture 28 thereof receiving an upper portion of the knob portion 20 therethrough whereby the semi-circular electronic grid 16 of the first circular disk 12 is in selective alignment with the circular recess 30 of the second circular disk 26. An outer edge 32 of the second circular disk 26 has indicia 34 thereon for the indication of speed attained by the vehicle. The first circular disk 26 is rotatable in relationship to the second circular disk 12 whereby the electronic grid 16 can be positioned strategically within the circular recess 30. The driver of the automobile can manually rotate the first circular disk 12 so that the electronic grid 16 is positioned within the circular recess 30 at the speed indicated by the indicia 34 so as to control the speed at which they would travel. A pair of apertures 36 are formed through a lower portion of the second circular disk 26 to allow for the added option of controls that would automatically adjust the first circular disk 12 so that the electronic grid 16 is positioned within the circular recess 30 at a desired speed indicated by the indicia 34, such as those speeds travelled on the highway and in the city.

The third component of the device 10 is an indicating needle 38. The indicating needle 38 has a first end 40 and a second end 42. The second end 42 is shaped in the head of the needle with a pointed end portion. The first end 40 is rotatably coupled with the upper portion of the knob portion 20. The second end 42 has a magnetic portion 44 extending downwardly therefrom. The magnetic portion 44 extends through the circular recess 30 of the second circular disk 26. The magnetic portion 44 functions to contact the electronic grid 16 of the first circular disk 12 when a certain speed is attained.

The final component of the device 10 is a speaker 48 secured within a housing 50. The housing 50 has a back portion with adhesive 52 thereon. The adhesive 52 has a peel-off layer 54 disposed thereon. The speaker 48 has wiring 54 extending outwardly of the housing 50 to couple with the existing speedometer relay 18 of the automobile and with the semi-circular electronic grid 16 of the first circular disk 12. The speaker 48 is adapted for securement within the automobile. Once the magnetic portion 44 of the needle 38 comes in contact with the electronic grid 16 of the first circular disk 12, an electronic signal is sent to the speaker 48 which lets out an audio signal to alert the driver of the automobile that he/she has exceeded the set speed as indicated by the positioning of the electronic grid 16 in relation to the indicia 34 on the second circular disk 26.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A speed alarm system for an automobile for alerting a driver that they are exceeding a set speed in an automobile comprising, in combination:

a first circular disk having an aperture formed through a central portion thereof, the first circular disk having a semi-circular electronic indicator grid formed around an outer periphery thereof, the first circular disk rotatably positioned on an existing speedometer relay of an automobile through the aperture thereof and coupled thereto by a knob portion;

a second circular disk having an aperture formed through a central portion thereof, the second circular disk having a circular recess formed therein inwardly of an outer periphery thereof, the second circular disk positionable with the aperture thereof receiving an upper portion of the knob portion therethrough whereby the semi-circular electronic grid of the first circular disk in selective alignment with the circular recess of the second circular disk, an outer edge of the second circular disk having indicia thereon for the indication of speed attained by the vehicle, the first circular disk being rotatable in relationship to the second circular disk whereby the electronic grid can be positioned strategically within the circular recess;

an indicating needle having a first end and a second end, the first end being rotatably coupled with the upper portion of the knob portion, the second end having a magnetic portion extending downwardly therefrom, the magnetic portion extending through the circular recess of the second circular disk; and a speaker secured within a housing, the housing having a back portion with adhesive thereon, the adhesive having a peel-off layer disposed thereon, the speaker having wiring extending outwardly of the housing to couple with the existing speedometer relay of the automobile and with the semi-circular electronic grid of the first circular disk, the speaker adapted for securement within the automobile.

2. A speed alarm system for an automobile for alerting a driver that they are exceeding a set speed in an automobile comprising, in combination:

a first circular disk having a semi-circular electronic indicator grid formed around an outer periphery thereof, the first circular disk rotatably positioned on an existing speedometer relay of an automobile and coupled thereto by a knob portion;

a second circular disk having a circular recess formed therein inwardly of an outer periphery thereof, the second circular disk positionable through an upper portion of the knob portion whereby the semi-circular electronic grid of the first circular disk in selective alignment with the circular recess of the second circular disk;

an indicating needle having a first end and a second end, the first end being rotatably coupled with the upper portion of the knob portion, the second end having a magnetic portion extending downwardly through the circular recess of the second circular disk; and a speaker having wiring extending outwardly thereof to couple with the existing speedometer relay of the automobile and with the semi-circular electronic grid of the first circular disk.

3. The system as described in claim 2 and further including indicia on an outer edge of the second circular disk for the indication of speed attained by the vehicle.

4. The system as described in claim 2 wherein the first circular disk being rotatable in relationship to the second circular disk whereby the electronic grid can be positioned strategically within the circular recess.

5. The system as described in claim 2 wherein the speaker is secured within a housing, the housing having a back portion with adhesive thereon, the adhesive having a peel-off layer disposed thereon.

\* \* \* \* \*